July 28, 1936.  N. E. WAHLBERG  2,049,144
BRAKE LEVER
Filed June 28, 1935
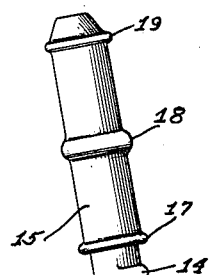
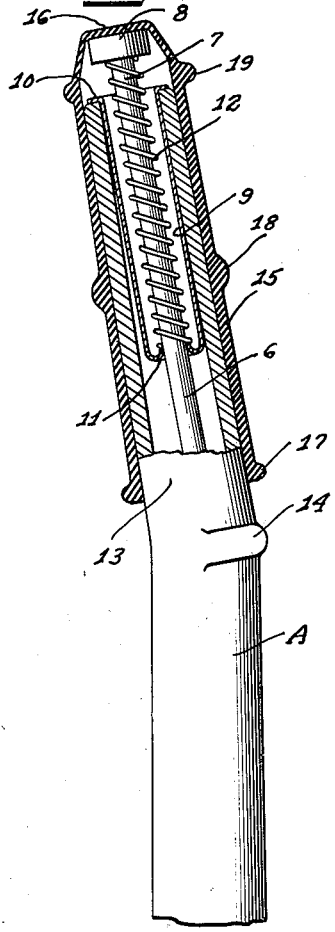
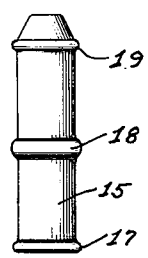
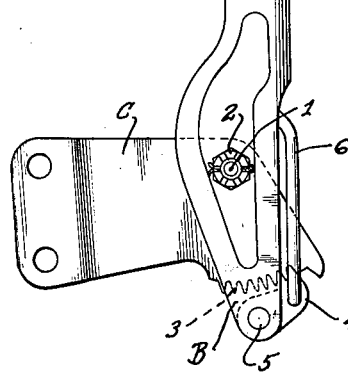
Inventor
N. Erik Wahlberg.
by Charles H. Hill Attys.

Patented July 28, 1936

2,049,144

UNITED STATES PATENT OFFICE 2,049,144

BRAKE LEVER

Nels Erik Wahlberg, Kenosha, Wis., assignor to Oakes Products Corporation, North Chicago, Ill., a corporation of Michigan Application June 28, 1935, Serial No. 28,826

1 Claim. (Cl. 74—543)

The present invention relates to brake levers and more particularly to brake levers for automotive vehicles.

Brake levers for automotive vehicles, are, at the present time, constructed from flat pieces of metal suitably shaped to provide hollow levers and handle portions, with the operating rods for the pawls within the hollow portions of the lever and handle, and manipulating buttons secured to the rods and operable by thumb pressure applied in the upper ends of the levers.

In the manufacture of such brake levers it has sometimes been found that in order to provide smooth handle portions of the levers, grinding or polishing of the handle portions of the levers is required. This of course adds to the manufacturing cost of such levers and retards production on quantity basis.

The present invention has to do with automotive brake levers and more particularly to a member which may be applied over the handle portion of a brake lever to afford a smooth cushion handle portion for the lever.

An object of the present invention is to provide an article of manufacture comprising a member applicable over the handle portion of a brake lever and which member has a closed end for overlying the operating button of the lever.

Another object of the present invention is to provide an enclosure member for an automotive brake lever handle, which member is fashioned of cushion or resilient material and which applied, affords a convenient and comfortable hand grip and at the same time is so constructed as to permit ready manipulation of the operating button in the usual manner.

A further object of the present invention contemplates the provision of an enclosure member for the handle portion of a brake lever which member is of elastic material such as rubber or rubber composition, provided on its exterior surface with ribbed means to prevent the operator's handle from slipping off of the brake lever and which member at the same time is provided with closed end overlying the button of the lever whereby such button may be readily operated by thumb pressure applied against the closed end of the member.

Another and still further object of the present invention is to improve brake lever construction so that a comfortable cushion handle portion is provided at minimum cost.

The above, other and further objects of the present invention will be apparent from the following description and accompanying drawing.

An embodiment of the present invention is illustrated in the accompanying drawing and the views thereof are as follows:

Figure 1 is an elevational view of a closure member adapted to be applied over the handle portion of an automotive brake lever.

Figure 2 is an elevational view of a conventional brake lever showing the closure member of the present invention applied to the handle portion of the lever.

Figure 3 is a view, partially in elevation and partially in section, showing the closure member of the present invention applied over the handle portion of a brake lever and illustrating the position of the parts when the pawl is in engagement with its ratchet, that is with the manipulating button elevated from the adjacent end of the lever.

The drawing will now be explained.

Fig. 2 illustrates a conventional automotive brake lever, A, which is hollow and which at its lower end has the well known separated and parallel legs B for straddling an attaching bracket C which is applied in the usual manner to the frame of an automotive vehicle. The lever A is pivoted to the bracket C by pivot bolt 1 on which is the usual castellated nut 2. The bracket C is, along a portion of its lower margin, provided with the usual toothed rack 3, with which cooperates a pawl 4 pivoted at 5 to the lower extremity of the lever A.

The pawl 4 is actuated by a pull rod 6, attached at its lower end to the pawl and which extends through the hollow lever A and through the hollow handle portion of the lever with its extremity normally extending above the upper end of the lever. Applied to the extremity of the pull rod 6 is a manipulating button 8 secured to the rod by any suitable means, as for example by means of a pin passing through the button and the rod.

Within the handle portion of the hollow lever A is a cup 9, extending inwardly from the upper end of the lever and which has an outturned flange 10 at its upper end resting against the upper extremity of the lever. The cup is apertured at 11 to receive the rod 6 and with the end of the cup fashioned so that the margins of the aperture are inturned for guiding the rod 6 as it is moved in use. Between the lower end of the cup 9 and the under surface of the manipulating button 8 is a spring 12, surrounding the rod, whose function is to maintain the manipulating button 8 at its elevated position so as to retain the pawl 4 in engagement with proper tooth of the rack 3 of the bracket C, so that at all times the lever A is, under normal conditions, latched to the bracket C.

A handle portion 13 of the lever A is, as a rule, substantially cylindrical throughout its length and is that portion of the lever about a rib 14 formed in the lever in its course of manufacture and which serves as a guide for grasping of the lever by the operator of the vehicle.

Ordinarily the exterior of the handle portion 13 of any lever is smooth so as to prevent injury to the hand of an operator when grasping the lever.

It sometimes happens that an operator, in reaching for the brake lever, in an emergency, has encountered the experience of having his hand slip off of the lever, because of the smoothness of the handle portion of the same, and often times as a result of such slipping, accident has resulted.

The closure member of the present invention as herein illustrated is an elongated cylindrical member 15 having a closed end 16, with its opposite end open for application over the handle portion of a brake lever. Formed in the closure member are ribs 17, 18 and 19 which prevent an operator's hand from slipping from the closure when applied to a brake lever, and thus assures proper manipulation of the brake under emergency circumstances.

Preferably the closed end portion of the member 15 is reduced in thickness, slightly, from the thickness of the balance of the closure to flex or yield whenever the operator manipulates the button 8 by thumb pressure applied against such button through the closed end 16 of the closure 15.

The closure member 15 is made preferably of rubber or rubber composition, so as to be elastic enough to be applied over the handle of a brake lever with a tight fit and possesses cushion characteristics to afford a comfortable grip for the lever.

The closure 15 of the present invention, when applied to a brake lever, supplies a finished effect to the brake lever which is not otherwise achieved. At the same time such closure member affords a comfortable cushion grip and also possesses sufficient friction characteristics to prevent an operator's hand from slipping off of the handle when the lever is gripped. Furthermore the provision of the closure member of the present invention protects the operator's hand against injury which might occur in the event that the brake lever handle were rough or uneven in spots.

The closing of the upper end of the brake lever, by the closure of the present invention, prevents dirt from entering the interior of the lever and interfering with the effectiveness of the spring 12 in use.

Use of the closure member of the present invention, in connection with automotive vehicle brake levers, eliminates need for finishing the handle portions of such levers by either grinding or plating and thus enables manufacturing cost of such levers to be kept at a minimum. The closures of the present invention are applied to the levers quickly and easily and because of the inherent characteristics of the composition used, remain firmly in place.

While the closure 15 is herein shown and described as provided with three ribs 17, 18 and 19, it is of course to be understood that some or all of these might be eliminated, if desired, or that more might be employed, if wanted. Furthermore the closure member 15 might be fashioned with corrugations extending lengthwise of the member, that is between the ribs 17, 18 and 19, for securing additional cushion and resilient features.

The closure member 15, being elastic, very readily fits any handle portion 13 of a brake lever, which handle portion is of normal size. The closure member 15 will fit such handle portion be it cylindrical or slightly tapering as the closure 15 is designed to be stretched when applied and to be retained in position by its elastic characteristics.

The closure member 15 is in effect an elastic sock applicable to the handle portion of a brake lever, for affording a cushion and friction grip.

The invention has been described herein more or less precisely as to details, yet it is to be understood that the invention is not to be limited thereby, as changes may be made in the arrangement and proportion of parts and equivalents may be substituted, without departing from the spirit and scope of the invention.

The invention is claimed as follows:

As an article of manufacture, a hollow elastic grip member adapted to be applied over the handle of a brake lever, said member having a closed end for overlying and concealing the operating button of the lever, and said closed end being reduced in thickness to readily flex when the manipulating button is depressed by thumb pressure applied against said end.

N. ERIK WAHLBERG.